United States Patent [19]

Herd

[11] Patent Number: 4,685,655

[45] Date of Patent: Aug. 11, 1987

[54] PRESSURE-BALANCED GATE FOR SPLIT-GATE VALVE

[75] Inventor: David P. Herd, Houston, Tex.

[73] Assignee: Smith International, Inc., Newport Beach, Calif.

[21] Appl. No.: 824,188

[22] Filed: Jan. 30, 1986

[51] Int. Cl.[4] .............................................. F16K 3/18
[52] U.S. Cl. .................................... 251/282; 251/175; 251/195; 251/327
[58] Field of Search ............... 251/326, 327, 328, 329, 251/282, 175, 193, 195, 196

[56] References Cited

U.S. PATENT DOCUMENTS

| | | | |
|---|---|---|---|
| 712,485 | 11/1902 | Bickford | 251/175 |
| 2,827,260 | 3/1958 | Jordan | 251/282 |
| 2,976,008 | 3/1961 | Ocker | 251/175 |
| 3,123,090 | 3/1964 | Bredtschneider | 251/327 X |
| 4,272,055 | 6/1981 | Herd | 251/282 X |
| 4,340,204 | 7/1982 | Herd | 251/327 |
| 4,451,047 | 5/1984 | Herd et al. | 251/214 X |

FOREIGN PATENT DOCUMENTS

| | | |
|---|---|---|
| 968132 | 8/1964 | United Kingdom . |
| 1403959 | 8/1975 | United Kingdom . |
| 2154303A | 9/1985 | United Kingdom . |

*Primary Examiner*—Martin P. Schwadron
*Assistant Examiner*—Stephen M. Hepperle
*Attorney, Agent, or Firm*—William E. Shull; Paul F. Simpson

[57] ABSTRACT

A split gate for a gate valve regulating fluid flow with reduced gate drag. The split gate comprises a plurality of members for sealing a flowway intersecting a valve chamber. A first member seats against a first portion of the flowway and has a pressure-balancing surface pressure-isolated from the first flowway portion and from the valve chamber. A second member seats against a second portion of the flowway and allows pressure in the second flowway portion to bear on the pressure-balancing surface of the first member. Pressure in the valve chamber exceeding pressures in the flowway portions creates pressure differentials pressing the gate members more firmly against their seats, thereby increasing the frictional resistance opposing reciprocation of a closed gate to its open position. The invention provides that, to the extent of the area of the pressure-balancing surface, the net pressure differential seating the first member is the first flowway portion-to-second flowway portion pressure differential, in place of the higher pressure differential between the valve chamber and the first flowway portion. A similar result is obtained for the second member by reducing the areas for pressure differential to act on the second member. The invention thus reduces the effects of internal valve pressure differentials to lower the frictional gate drag resisting opening of the gate.

17 Claims, 4 Drawing Figures

PRESSURE-BALANCED GATE FOR SPLIT-GATE VALVE

BACKGROUND OF THE INVENTION

The present invention relates generally to the field of fluid flow control valves. More particularly, it relates to gate valves and, still more particularly, to split-gate valves employed in production and processing of oil and gas.

As industry finds and produces hydrocarbons trapped in ever-higher pressure environments, the demands on hydrocarbonhandling equipment constantly increase. Higher pressures and more extreme environments create stresses and strains on equipment that previously were unforeseen. New problems and unanticipated difficulties develop where, before, conditions were not so severe. One field experiencing ever-increasing demands for performance is fluid valve technology.

Gate valves are commonly used in oilfield process systems to control fluids at high pressures. A standard through-conduit gate valve includes a valve body having a flowway through which fluids pass, and a valve chamber intersecting this flowway on the interior of the valve body. A movable gate within the valve chamber can be reciprocated up or down across the flowway to regulate flow. With the gate in its upper, or open, position, for example, a flow port in the gate aligns with the flowway to permit fluids to flow through the valve. In the lower, or shut, position, the solid portion of the gate blocks flow through the flowway. The gate is reciprocated within the valve chamber usually by means of a stem, which in turn is actuated by various other means external to the valve, e.g., manual, electric, hydraulic or pneumatic actuation means.

One prior art gate valve has a gate split into separate, symmetrical gate members. The gate members along a plane aligned with the longitudinal axis of the valve stem. The construction of the valve also allows the valve chamber to be in communication with the high pressure in the flowway while this gate is in the open position. The valve chamber then retains the elevated pressure after the gate closes. The pressure thus trapped in the valve chamber then communicates with a space between the gate members of the closed split gate. This trapped pressure presses outward on the gate members, thereby ensuring sealing engagement with the valve body. The valve chamber pressure also forces sealant material to flow through distribution channels to provide sealant to the appropriate seal locations. The valve chamber pressure thus provides the motive force for pressurizing the seals that maintain the leak-tight integrity of the valve when the gate is shut.

This type of valve, requiring a pressurized valve chamber for optimum sealing operation, often has a pressure differential between the valve chamber and at least one portion of the sealed flowway, usually the downstream portion, due to a partial or total loss of pressure in that flowway portion after the valve is closed. In high-pressure valves, especially, this pressure differential can be quite considerable, up to 15,000 to 20,000 psi, or more. In valves of this split-gate design, with gate members free to move against their respective seats in response to this chamber-to-flowway differential pressure, the differential actually helps to maintain the leak-tight seal. The high pressure on the chamber side of each gate member, being greater than the pressure on the flowway side, presses the gate member more tightly against seats in the valve body. With the gate member pushed more firmly against these seats, the flowway is more effectively sealed. The pressure within the valve chamber, then, serves the dual purpose of providing a seating force to help maintain sealing contact between the gate members and their seats, as well as pressurizing the seat seals themselves.

The valve chamber pressure can sometimes create a problem in a split-gate valve. As previously described, the gate members are free to spread apart and press against their respective valve body seats in response to a differential between pressure inside the valve chamber and pressure outside, in either of the exterior, sealed portions of the flowway. As noted above, such a pressure differential between the valve chamber and the downstream, pressure-depleted portion of the closed flowway is desirable for maintaining the pressure seal. Normally, though, the pressure in the upstream portion of the flowway remains the same as the pressure trapped inside the valve chamber, so there is no pressure differential across the upstream gate member. On occasion, however, there may be very quick depletion of pressure in a connected upstream system. This depletion makes the upstream flowway portion similarly lose its pressure very rapidly. Consequently, the valve chamber retains its original higher pressure, while both upstream and downstream portions of the flowway have much lower pressures. To open the valve, the gate must be reciprocated back to the upper position. The seating force arising from the differential in pressure between the valve chamber and the flowway, while helping to keep each gate member pressed against its seat, also increases friction between the gate member and the seat. This friction resists reciprocating motion of the gate. The friction force so resisting the gate motion is termed "gate drag."

The gate valve is then said to be "pressured-locked." When only the downstream portion of the flowway is pressure-depleted and the valve chamber retains higher pressure, only the downstream gate member experiences gate drag. In the pressure-locked condition, however, the valve chamber pressure forces both the downstream and the upstream gate members against their respective seats. Greater friction acting on both gate members heightens the valve's total gate drag. The magnitude of the gate drag, moreover, increases in proportion with the amount of the pressure differential. High-pressure valves demand an even greater gate-opening force in the pressure-locked condition than do lower-pressure valves.

The increased gate drag can tax or exceed the capabilities of the gate-actuation means, including the stem and whatever external means work to move the stem. The stem size could be increased, but at a cost of increasing all the associated parts of the valve. Economy and space also limit the feasible size of the gate actuation means. It can be seen, then, that a need exists for lessening gate drag at a minimum expense, without increasing the size or complexity of valves or actuators. As greater pressures are encountered, this need will only grow more acute.

SUMMARY OF THE INVENTION

Accordingly, there is provided herein a new and improved split-gate for regulating fluid flow while reducing gate drag in a split-gate valve. The pressure-balanced gate of the present invention comprises a plurality of gate members that work cooperatively in sealing a valve flowway. One member possesses a pressure-balancing surface that is pressure-isolated from a first portion of the sealed flowway and from the valve chamber. A second member allows pressure in a second portion of the sealed flowway to bear on the pressure-balancing surface of the first member.

When the valve is in the pressure-locked condition, the pressure in the valve chamber exceeds the pressure in either flowway portion. The pressure communicated from the second sealed flowway portion and acting on the pressure-balancing surface of the first member tends to seat the first member. The pressure-balancing surface, moreover, is pressure-isolated from the valve chamber. To the extent of the area of the pressure-balancing surface, then the chamber-to-flowway pressure differential pressing the first member against its seat is replaced by the pressure differential (if any) between the sealed portions of the flowway. The same result obtains for the second member to the extent it also has a pressure-balancing area or other means of eliminating the seating force caused by valve chamber-to-flowway pressure differential. The invention thus lowers the net seating force arising from pressure differential and pressing the gate members against their seats, and hence reduces the resultant friction force felt as gate drag.

The valve chamber pressure, when it exceeds the reduced pressures in the flowway portions, helps keep the gate members pressed against their seats. The valve chamber-to-flowway pressure differential thus serves the beneficial purpose of maintaining the valve gate seal. To preserve this beneficial effect, seals isolate the pressure-balancing surface from the valve chamber. Further, these seals are located so there remains on each gate member an area, designated a chamber surface, where valve chamber pressure acts in opposition to the pressure in the sealed flowway portions. In achieving a desired net force pushing each gate member against its seat, only the net area on each gate member is of concern, i.e., the net area of the opposing surfaces on each gate member that experience pressures in a direction tending either to seat or to unseat the gate member. Accordingly, the present invention provides that, when the gate is shut, the pressure-balancing surface of the first member acted on by the pressure communicated from the second flowway portion, which pressure tends to seat the first member, is smaller than the surface on the first member acted on by pressure in the first flowway portion, which pressure tends to unseat the first member. This arrangement ensures that the higher valve chamber pressure is able to act on the chamber surface of the first member in opposition to pressure in the first portion of the flowway, thereby keeping the first member sealed and seated against the flowway as long as the valve chamber pressure exceeds the pressure in the first flowway portion. If the first flowway portion pressure were to become greater than the valve chamber pressure and unseat the first member, the two pressures would equalize. In this instance, however, the valve chamber pressure would still act to seat the second member, thus preserving the second member's seal and the overall leak-tight integrity of the valve.

The second member may allow pressure communication between the first member and the second flowway portion by means of an opening in the second member. Such an opening prevents any pressure differential from adding to forces seating the second member, to the extent of the area of such opening. The area of such opening is sized so there remains a chamber surface on the second member acted upon by valve chamber pressure in opposition to second flowway portion pressure. Alternatively, if the second member has a pressure-balancing surface, the net pressure-balancing surface on the second member, similar to that on the first member, is smaller than the surface acted upon the pressure in the second flowway portion that tends to unseat the second member. Either configuration serves to ensure a net seating force, due to the valve chamber-to-second flowway portion pressure differential, helping to hold the second member in a seated, sealing position.

These and various other objects and advantages of the present invention will become readily apparent to those skilled in the art upon reading the following detailed description and claims and by referring to the accompanying drawings.

DETAILED DESCRIPTION OF THE PREFERRED EMBODIMENT

Figure 1:
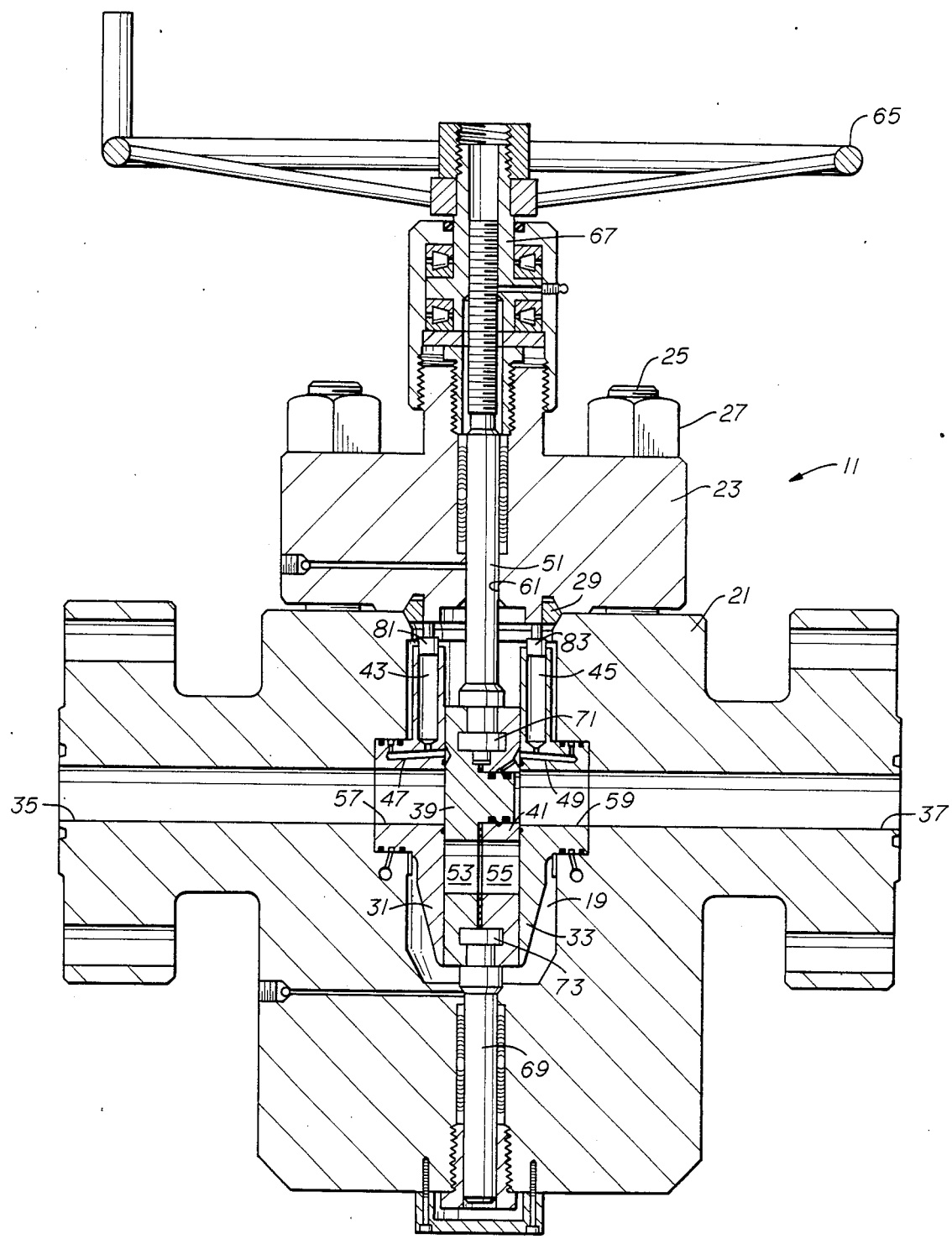
FIG. 1 is a vertical section through a valve built in accordance with the principles of the invention.

Referring to FIG. 1, there is shown therein a valve 11 including a hollow vessel having a body part 21 and a bonnet part 23 secured thereto by studs 25 and nuts 27, thereby sealing the top of valve chamber 19 within the body part 21. The bonnet part 23 is sealed to the body part 21 by a gasket 29. Seats 31,33 mounted within the valve chamber 19 and at the inner ends of flowway portions 35,37 cooperate with a gate, comprising a pair of ported gate members 39, 41, which controls flow of fluid, e.g., water, oil, or gas, through the valve 11. Sealant material is stored below reservoir pistons 81,83 mounted and reciprocally movable within reservoirs 43,45. Pressure in the valve chamber 19 acts on the reservoir pistons 81,83 to force the sealant as needed automatically through sealant distribution passages 47,49.

Gate members 39,41 are reciprocated by a generally cylindrical actuating stem 51 between a closed position, shown in FIG. 1, where flow of fluids through flowway portions 35,37 is prevented, and an open position permitting such flow in which gate ports 53,55 are in register with ports 57,59 in seats 31,33. The upper end of actuating stem 51 extends out of valve chamber 19 and through port 61 in bonnet 23.

When hand wheel 65 is turned, actuator nut 67 turns and causes actuator stem 51 to raise or lower gate members 39,41 to which the stem is connected by upper tee connector 71. This in turn causes balance stem 69, connected to the gate members by lower tee connector 73, to move up or down. For further explanatory detail of the design features and workings of valve 11, see generally the description of FIG. 1 of U.S. Pat. No. 4,451,047 issued May 29, 1984, to Herd and Gibson, entitled "Seal."

Figure 2:
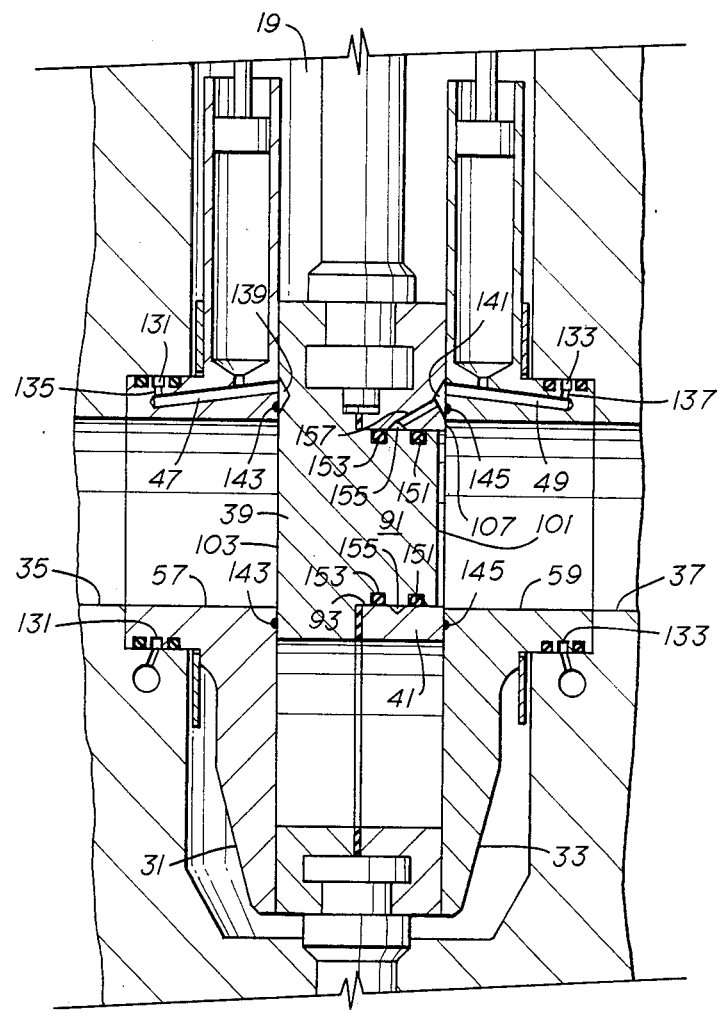
FIG. 2 is a fragmentary sectional view of the valve depicted in FIG. 1, showing the gate and associated elements in greater detail.

FIG. 2 illustrates gate members 39,41 situated between opposing, substantially symmetric seats 31,33 installed at the inner ends of flowway portions 35, 37 within the valve chamber 19. It is to be understood that the gate members 39,41 can be substituted for other valve closure members that do not embody the present invention but which are otherwise operable in a valve as generally depicted in the drawings.

FIG. 2 shows the gate members 39,41 in the lower, closed position, with gate ports 53,55 out of register with seat ports 57,59, thereby preventing flow through the valve 11. Sealant flows from sealant distribution passages 47,49 through sealant passages 135,137 to maintain a seal between the seats 31,33 and the valve body at the seat hub-to-valve body sealing grooves 131,133. With the gate members 39,41 in the closed position as shown, sealant can also flow from the sealant distribution passages 47,49 through the jumpers 139,141 in the face of the gate members 39,41 to the gate-to-seat sealing grooves 143,145. The gate members 39,41 have external sealing surfaces 103,107 facilitating maintenance of a pressure seal between the seats 31,33 and the gate members 39,41. The first member 39 has a projecting hub 91 fitting into a hub bore 93 within the body of the second member 41. A pressure seal is maintained between the projecting hub 91 and the hub bore 93 by means of sealant flowing to the jumper 141 from the sealant distribution passage 49 when the second member 41 is in the closed position. The sealant then flows through a sealant passage 157 in the body of the second member 41 to a hub sealing groove 155 disposed around the inner diameter of hub bore 93. Hub seal elements 151,153 help maintain the pressure-tight connection between the projecting hub 91 and the inner face of the hub bore 93. Pressure bearing on a pressure-balancing surface 101 of the first member 39 thus stays the same as pressure within second flowway portion 37 when the gate members 39,41 are closed. With the valve 11 in the pressure-locked condition, the pressures in the flowway portions 35,37 are less than the pressure of the valve chamber 19. The pressure-induced force holding the first member 39 against the seat 31 is then only the sum of first flowway portion 35-to-second flowway portion 37 differential pressure (if any) bearing on the pressure-balancing surface 101, plus the valve chamber 19-to-first flowway portion 35 differential pressure bearing on an area equal to the first flowway portion sealing surface 103 reduced by the amount of the pressure-balancing surface 101. The net force arising from differential pressure and holding the first member 39 against the seat 31 can be described as follows:

$$F_1 = [(P_2 - P_1) \times A_B] + [(P_c - P_1) \times (A_1 - A_B)]$$

$$= [P_c \times (A_1 - A_B)] + (P_2 \times A_B) - (P_1 \times A_1)$$

where:
$F_1$ = Force due to differential pressure pressing first member 39 against seat 31;
$P_1$ = Pressure within first flowway portion 35;
$P_2$ = Pressure within second flowway portion 37;
$P_c$ = Pressure within valve chamber 19;
$A_1$ = Area of first flowway portion sealing surface 103;
$A_B$ = Area of pressure-balancing surface 101.

In the absence of the invention, by contrast, the differential pressure-induced sealing force holding the first member 39 against its seat 31 results from the valve chamber 19-to-first flowway portion 35 differential pressure acting on the equivalent of the entire first flowway portion sealing surface 103. This force, which applies generally to prior art split gates, can be defined as follows:

$$F_1 = (P_c - P_1) \times A_1$$

$$= (P_c \times A_1) - (P_1 \times A_1)$$

where the variables are generally the same as described previously. It can be seen, then, that the force holding the first member 39 against the seat 31 is reduced considerably from the prior art split gate to the split gate made according to the invention. Valve chamber 19 pressure, $P_c$, is never less than $P_1$ or $P_2$. In the pressure-locked condition, $P_1$ and $P_2$ equal zero pressure, while $P_c$ is high. Then, in a prior-art valve, $F_1$ equals $(P_c \times A_1)$, while $F_1$ in a valve made according to the present invention equals only $[P_c \times (A_1 - A_B)]$. The larger $A_B$ is, the more the seating force is reduced by the present invention.

Similarly, using the present invention, the net pressure-induced force holding the second member 41 against the seat 33 arises from the valve chamber 19-to-second flowway portion 37 differential pressure bearing only on an area equal to the second flowway portion sealing surface 107 as reduced by the area of the hub bore 93. The net effect is thus less gate drag due to reduced friction on both gate members 39,41, yielding lowered resistance by the gate to force exerted by the actuating stem 51 to open the valve 11.

Figure 3:
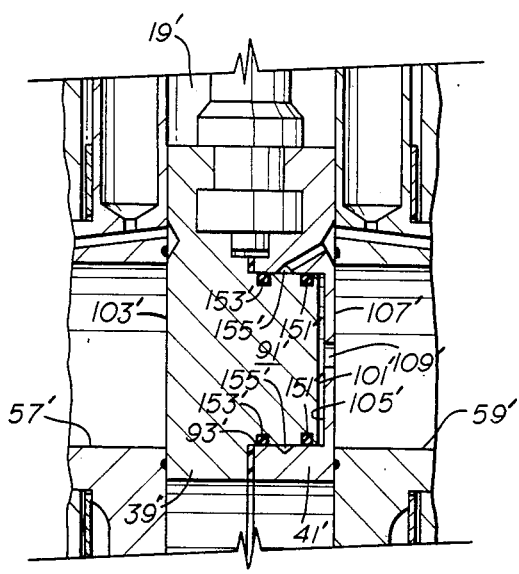
FIG. 3 is a fragmentary sectional view of a valve, valve gate, and associated elements built in accordance with the principles of the invention.

FIG. 3 shows another configuration of a split gate built according to the invention. The gate comprises two gate members 39', 41' sealing flowway portions 35', 37' (not shown) leading to seat ports 57', 59' within valve chamber 19'. A projecting hub 91' of the first member 39' and a corresponding hub bore 93' extend only partially through the body of the second member 41'. The first member 39' serves to seal the first flowway portion 35'. An equalizing bore 109' provides communication between the pressure in the second flowway passage 37' and the pressure-balancing surface 101' on the projecting hub 91' of the first member 39'. The same pressure also bears on the pressure-balancing surface 105' of the second member 41' in this configuration.

Still with reference to FIG. 3, the valve chamber 19'-to-first flowway 35' differential pressure effectively bears only on an area equal to the area of a first flowway portion sealing surface 103' on the first member 39', reduced by the area of the pressure-balancing surface 101', resulting in a seating force on the first member 39' that is lower than that in prior-art, nonpressure-balanced split-gate valves. The seating force on the second member 41' is similarly reduced. As shown in FIG. 3, the second member 41' possesses a pressure-balancing surface 105'. Pressure from the second flowway portion 37' communicates through the equalizing bore 109' to bear on the pressure-balancing surface 105' as well as on an opposing second flowway portion sealing surface 107' on the second member 41'. With this balancing of opposing pressure, the communicated flowway pressure contributes no net seating force to press the second member 41' against the seat 33'.

Figure 4:
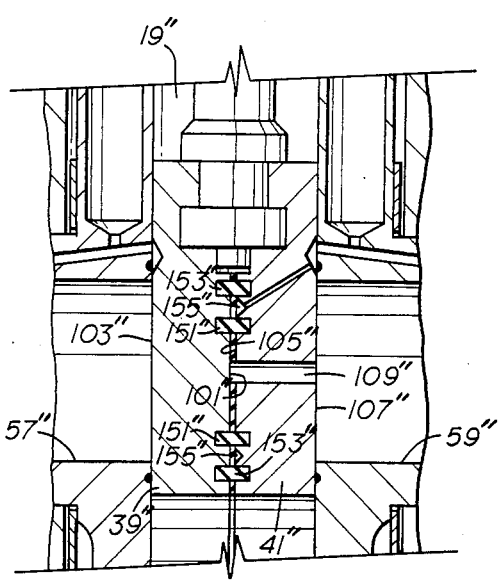
FIG. 4 is a fragmentary sectional view of a valve, valve gate, and associated elements built in accordance with the principles of the invention.

In the split gate depicted in FIG. 4, two gate members 39", 41" seal flowway portions 35", 37" (not shown) leading to seal ports 57", 59" within valve chamber 19". Seal elements 151", 153" and sealing groove 155" isolate pressure on a pressure-balancing surface 101", on first member 39", that is disposed within a space interior to both gate members 39", 41". An equalizing bore 109" through the second member 41" connects the pressure-balancing surface 101" with the pressure in the second flowway portion 37". Thus the area of the first member 39" acted upon by pressure in the valve chamber 19" is limited by the area of the pressure-balancing surface 101". Only the differential in pressure (if any) between the first flowway portion 35" and the second flowway portion 37" acts on the pressure-balancing surface 101" of the first member 39". The second member 41" also has a pressure-balancing surface 105". The pressure bearing on the pressure balancing surface 105", being equal to the pressure bearing on an opposing second flowway portion sealing surface 107" on the second member 41", causes no additional seating force on the second member 41".

In the preferred embodiment of the invention, there is an optimum direction of fluid flow through the gate, although the gate will achieve the purposes of the invention irrespective of the flow direction. Referring, for example only, to FIG. 2, the optimum direction of flow is from the second flowway portion 37 to the first flowway portion 35. With such a flow direction and the valve in a non-pressure-locked condition, having the gate closed and the downstream flowway at zero pressure means the second flowway portion 37 and the valve chamber 19 will be at equal pressures, and the first flowway portion 35 will be depleted. With no differential pressure acting on the second member 41, there will possibly be continued pressure communication between the second flowway portion 37 and the valve chamber 19. Preserving leak-tight integrity of the valve 11 at the gate seals then depends on only one gate seal—the first gate-to-seal sealing groove 143.

By contrast, referring still to FIG. 2, fluid flowing in the non-optimum direction through the valve 11 would flow from the first flowway portion 35 to the second flowway portion 37. With the valve shut and not pressure-locked, the first flowway portion 35 and the valve chamber 19 would be at equal, higher pressures and the second flowway 37 would have zero pressure. Maintenance of the pressure integrity of the gate is less reliable since that integrity depends, in this non-optimum mode of flow, on two seals: the seal between the second member 41 and the seat 33, and the seal between the gate members 39, 41 that isolates the pressure-balancing surface 101 from the valve chamber 19. As seen in FIG. 2, the second gate-to-seat sealing groove 145 seals between the second member 41 and the seat 33. Containing the valve chamber 19 pressure, however, also depends on performance of the hub sealing groove 155 and the hub seal elements 151, 153. Fluid flow opposite to the optimum direction therefore reduces the dependability of the valve 11 pressure integrity, since depending on additional seals increases the probability, however slight, of leakage due to seal failure. In any instance, however, a split gate built according to the invention will experience lower pressure-locked gate drag than any prior art split gate, regardless of the direction of flow through the gate.

The invention prevents large pressure differentials tending to seat the gate members from acting on certain surfaces of the members, allowing instead for lesser (or zero) pressure differentials to bear on these surfaces. The invention thus lowers the net seating forces, thereby reducing the friction forces that oppose reciprocation of the gate. By lowering friction forces, the invention economically, easily, and readily reduces gate drag in split-gate valves.

Many varying and different embodiments are possible within the scope of the inventor's concept shown and described herein, without departing from the subject matter of the invention. As further examples, the gate members could be assemblies of other member parts combined to operate substantially as the depicted gate members act; such assemblies might include springs or the like, or the gate members themselves could be composed of smaller sub-members. Further, a design might not require both gate members (or assemblies) to move in unison during reciprocation; the gate elements could regulate flow through the flowway upon rotation or some other movement besides reciprocation; and some element other than a gate member with a bore through it could provide the means to communicate upstream pressure with the pressure-balancing areas. It should be understood that the invention is not restricted to the illustrated and described embodiments, but can be modified within the scope of the following claims.

I claim:

1. A gate for regulating fluid flow through a valve chamber intersecting a flowway, said gate comprising a plurality of gate members, one of said gate members having a sealing surface exposed to first flowway pressure in a first portion of the flowway and having a chamber surface pressure-isolated from the flowway and acted upon by pressure in the valve chamber in opposition to the first flowway pressure, the area of said sealing surface being greater than the area of said chamber surface, when said gate is in a closed position sealing the flowway.

2. A gate for regulating fluid flow through a valve chamber intersecting a flowway, said gate comprising a plurality of gate members, one of said gate members being a first member having a sealing surface that seals at least a part of a first portion of the flowway, having a chamber surface exposed to pressure in the valve chamber and pressure-isolated from the flowway, and having a pressure-balancing surface that is pressure-isolated from the valve chamber, pressure-isolated from the first portion of the flowway, and in pressure communication with a second portion of the flowway when said gate is in a closed position sealing the flowway.

3. The gate according to claim 2 wherein first flowway pressure in the first portion of the flowway bears on said sealing surface, and pressure within the valve chamber bears on a chamber surface of said first member in opposition to the first flowway pressure, when said gate is in a closed position sealing the flowway.

4. A gate for regulating fluid flow through a valve chamber intersecting a flowway, comprising a plurality of gate members including:
   a first member having a pressure-balancing surface and a sealing surface; and
   a second member having equalizing means; wherein, when said gate is in a closed position sealing the flowway, said pressure-balancing surface is pressure-isolated from chamber pressure in the valve chamber and from first flowway pressure in a first portion of the flowway, such first flowway pressure bearing on said sealing surface;
   said valve chamber is pressure-isolated from the flowway; and
   said equalizing means permits said flowway pressure in a second portion of the flowway to bear on said pressure-balancing surface in opposition to the first flowway pressure.

5. The gate according to claim 4 wherein said first member has a sealing surface acted upon by the first flowway pressure in opposition to the second flowway pressure, the area of said sealing surface being larger than the area of said pressure-balancing surface acted upon by the second flowway pressure in opposition to the first flowway pressure.

6. The gate according to claim 5 wherein the chamber pressure bears on a chamber surface of said first member in opposition to the first flowway pressure bearing on said sealing surface.

7. The gate according to claim 6 wherein said gate members are matingly engaged.

8. The gate according to claim 7 wherein said first member includes a hub and said second member includes a recess for receiving said hub.

9. The gate according to claim 8 including a seal disposed on the external surface of said hub and in sealing engagement with said hub and with said second member.

10. The gate according to claim 7 including a seal disposed in sealing engagement with said gate members at a location where said gate members matingly engage, said seal isolating said pressure-balancing surface from the chamber pressure.

11. The gate according to claim 10 wherein said seal includes an elastomeric seal.

12. The gate according to claim 7 wherein said second member also has a sealing surface, and said sealing surfaces are substantially smooth external surfaces for sealing against opposing sealing surfaces disposed within the valve chamber.

13. The gate according to claim 7 including attachment means for attaching a stem to said gate.

14. The gate according to claim 13 wherein said gate can be reciprocated across the flowway.

15. The gate according to claim 7 wherein said second member has a second pressure-balancing surface such that pressure bearing on said second pressure-balancing surface acts on opposition to the second flowway pressure bearing on a second sealing surface of said second member.

16. A gate for regulating fluid flow through a valve chamber intersecting a flowway, said gate comprising:

a plurality of ported gate members, including a first member having a hub with a pressure-balancing surface and an elastomeric seal disposed on the external surface of said hub, and further including a second member having a recess disposed therein; wherein, when said gate is in a closed position sealing the flowway, said hub is matingly received into said recess with said elastomeric seal in sealing engagement with said hub and said second member, thereby isolating said pressure-balancing surface from chamber pressure in the valve chamber and from first flowway pressure in the first portion of the flowway;

the chamber pressure bears on a chamber surface of said first member in opposition to the first flowway pressure bearing on a sealing surface of said first member; and said second member permits pressure in a second portion of the flowway to bear on said pressure-balancing surface.

17. A valve for regulating fluid flow, comprising:

a valve body having a valve chamber and a flowway intersecting said valve chamber;

seats disposed within said valve chamber for receiving a gate;

a gate for regulating fluid flow through said flowway, said gate having a plurality of ported gate members including a first member having a pressure-balancing surface and a second member having an equalizing means; and a valve stem for reciprocating said gate; wherein, when said gate is in a closed position sealing said flowway, said pressure-balancing surface is pressure-isolated from chamber pressure in said valve chamber and from first flowway pressure in a first portion of said flowway;

said valve chamber is pressure-isolated from said flowway;

said equalizing means permits pressure in a second portion of said flowway to bear on said pressure-balancing surface; and the chamber pressure bears on a chamber surface of said first member in opposition to the first flowway pressure bearing on a sealing surface of said first member.

* * * * *